UNITED STATES PATENT OFFICE 2,190,025

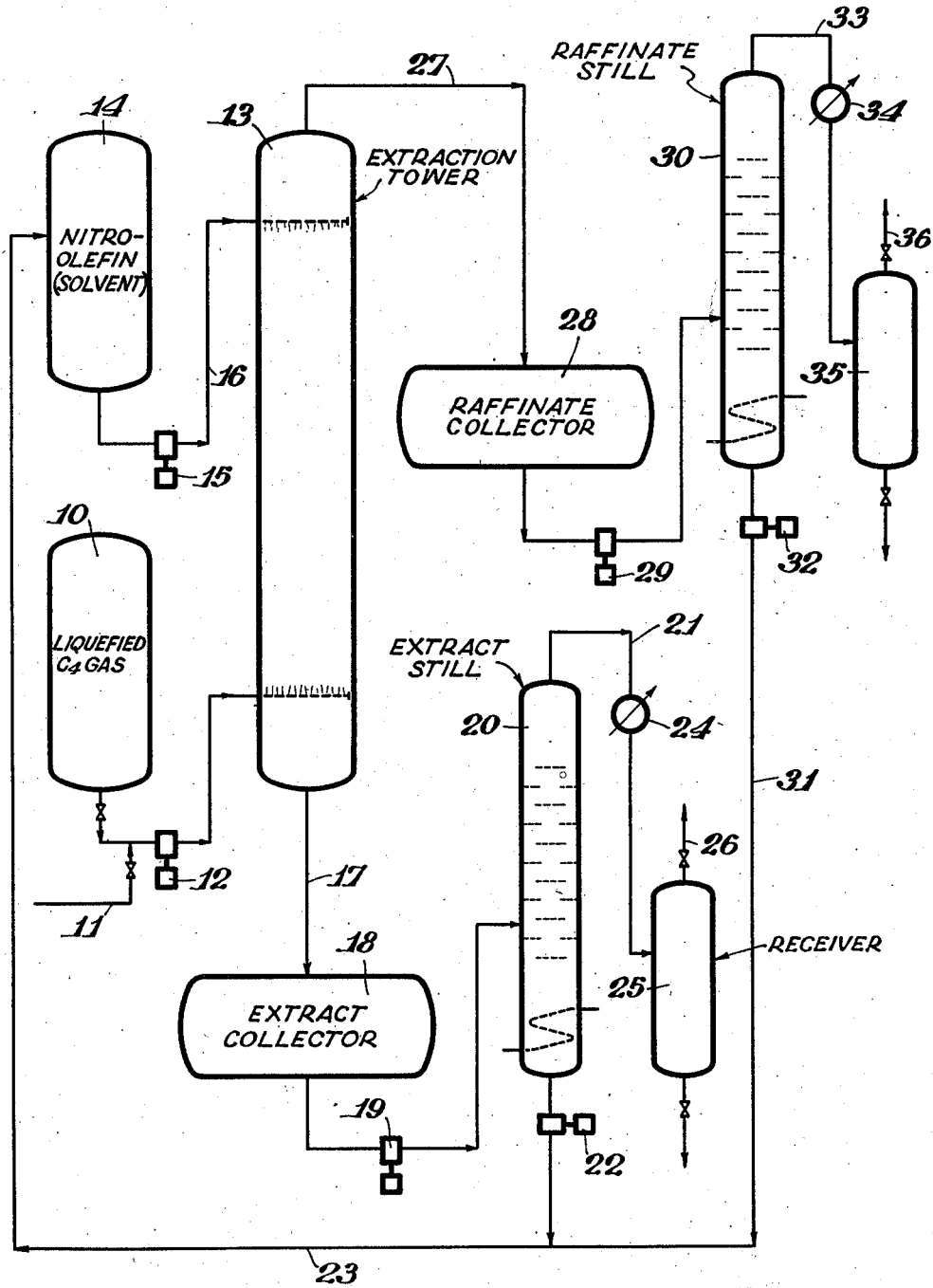

OLEFIN SEPARATION

Carl Max Hull, Chicago, Ill., assignor to Standard Oil Company, Chicago, Ill., a corporation of Indiana Application August 13, 1938, Serial No. 224,783

7 Claims. (Cl. 196—13)

This invention relates to the concentration and purification of olefins and it pertains more particularly to an improved method of separating gaseous olefins from closely related paraffinic gases by means of special solvents.

Many hydrocarbon conversion processes, both thermal and catalytic, require the use of specific olefin gases as charging stocks. Theoretically it is possible to separate olefins from paraffins by fractional distillation but this is practically impossible from an economic standpoint. The object of this invention is to provide a simple and inexpensive means for separating olefins from paraffins by the use of selective solvents.

I have discovered that nitro-olefins possess the property of selectively dissolving olefinic from paraffinic hydrocarbons. For instance, the critical solution temperature of a mixture of nitro-isobutylene and butane is about 40° F., at which temperature there is about 40% nitro-isobutylene in the mixture. Mixtures of butene-1 and nitro-isobutylene, or isobutylene and nitro-isobutylene, are miscible even at temperatures below —70° F. Thus nitro-isobutylene is a preferential solvent for separating the olefins, such as butene-1, butene-2 and isobutylene, from paraffins such as normal and isobutane.

The invention is particularly useful for the fractionation of gaseous hydrocarbons but is also applicable to the fractionation of normally liquid hydrocarbons. The invention will be more clearly understood from the following detailed description and from the accompanying drawing which forms a part of the specification and in which I have shown a diagrammatic flow sheet of the solvent extraction process.

My preferred solvent is nitro-isobutylene but it should be understood that any other nitro-olefin may be employed, particularly nitro-olefins having from 3 to 8 carbon atoms. The boiling point of the solvent should of course be sufficiently different from the boiling point of the material undergoing fractionation to facilitate solvent removal by ordinary distillation.

The nitro-olefins may be prepared in a variety of ways. A general method of preparation comprises the reaction of a halide of the allyl type with silver nitrate (J. Am. Chem. Soc. 51, 279 (1929)). Nitro-olefins may also be prepared by the condensation of aldehydes with nitro-paraffins in the presence of zinc chloride (Ind. Eng. Chem. 28, 344 (1936)) or they may be prepared by chlorinating nitro-paraffins and removing HCl from the chlorinated products. The specific method of making the nitro-olefins forms no part of the present invention, they may be prepared in the manners above indicated or in any other manner known to the art. (For example, see Bull. Acad. Roy. Belgique, (3) 34, 355 (1897); Ber. 61B, 2142 (1928); Bull. Soc. Chim., (3), 25, 912 (1901)). In my particular work I have employed a nitro-isobutylene prepared by nitric acid treatment of tertiary butyl alcohol (see Ann. 193, 368 (1878)). The product is a yellow oily material with a boiling point of about 180° F. at 40 mm. pressure.

A preferred example of my invention is the fractionation of ordinary petroleum refinery gases and particularly the $C_3$ and $C_4$ fractions of said gases. Propylene and the butylenes are of considerable importance in the chemical industry and they are of increasing importance in the manufacture of motor fuels and lubricating oils by processes of polymerization, alkylation, etc. In dealing with the refinery $C_3$—$C_4$ hydrocarbons, I may treat the $C_3$ and $C_4$ fractions individually or combined. The following description is illustrative of the process as applied to the refinery $C_4$ fraction. The $C_4$ fraction of refinery gases is preferably compressed, condensed and charged to an accumulator tank 10. The solvent may be used as a scrubber or absorber liquid for extracting olefins from gaseous hydrocarbons but I prefer to effect the fractionation in a system which is operated under sufficient pressure to maintain all of the hydrocarbons in the liquid phase.

The liquefied gases from accumulator tank 10 or from line 11 are introduced by pump 12 into the lower part of tower 13, which may of course be provided with any conventional packing material. Nitro-isobutylene from storage tank 14 is introduced by pump 15 and line 16 into the top of the tower. The tower may be operated at temperatures of from —80° F. to 150° F. depending upon the stock to be fractionated and the degree of separation desired, and under sufficient pressure to maintain the hydrocarbons in the liquid state. The lower the temperature employed the more efficient the fractionation will be. However, with $C_4$ charging stock I prefer to operate the tower at about —20 to +20° F. in order to obtain a satisfactory separation of the butenes from the butanes without excessive refrigeration costs.

The extract material from the base of the tower is conducted by line 17 to extract collector 18 and from this collector it is introduced by pump 19 into extract still 20. This still is provided with suitable bubble trays, entrainment arrestors and/or reflux means to prevent the loss of any solvent with the olefinic gases which are removed from the top of the still through line 21. It is not essential to remove absolutely all of the hydrocarbon from the solvent since this solvent is returned by pump 22 and line 23 to storage tank 14 for reuse in the system. The extract still is preferably operated under sufficient pressure to permit the liquefaction of the distilled olefinic gases by means of ordinary condenser water in condenser 24, the liquefied olefinic gases being collected in receiver 25 which is provided with a suitable safety vent line 26.

Raffinate from the top of the tower is withdrawn through line 27 to raffinate collector 28 and from this collector it is forced by pump 29 into raffinate still 30 which may be of the same type as still 20 hereinabove described. Solvent which is practically denuded of dissolved paraffinic gases is withdrawn from the base of the tower through line 31, forced by pump 32 through line 23 back to solvent storage tank 14. The paraffinic gases from the top of raffinate still 30 are withdrawn through line 33, liquified in condenser 34, and introduced into receiver 35 which is provided with safety vent line 36.

In the present example stills 20 and 30 are preferably operated at a temperature of about 120 to 180° F. and at a pressure ranging from atmospheric to about 50 pounds per square inch. Lower pressures would be used for less volatile charging stock. Nitro-olefins must be handled with care and necessary precautions must be taken to prevent overheating. I prefer to employ closed coils for supplying the heat of distillation and in these coils I may employ low pressure steam or any other suitable heat transfer fluid.

While I have described an improved method and means for separating butenes from butanes, it should be understood that the process is also applicable to the separation of other olefins from paraffins. Nitro-olefins having 5, 6, 7, 8 or more carbon atoms in the alkyl group of course are characterized by higher boiling points and may be used for the fractionation of normally liquid hydrocarbons.

Other modifications of the invention will be apparent to those skilled in the art and while I have described in detail the preferred embodiment of my invention, I do not limit myself to any of the said details except as defined by the following claims, which should be construed as broadly as the prior art will permit.

I claim:

1. The method of separating paraffinic from olefinic hydrocarbons which comprises selectively extracting said olefinic hydrocarbons with a nitro-olefin and subsequently separating said nitro-olefin from the extracted olefins by distillation.

2. The method of separating normally gaseous olefins from a mixture of normally gaseous olefins and paraffins which comprises contacting said mixture with a selective solvent comprising a nitro-olefin.

3. The method of separating normally gaseous olefins from a mixture of normally gaseous olefins and paraffins which comprises contacting said mixture with nitro-isobutylene under conditions of temperature and pressure to cause a solution of the olefins to the substantial exclusion of paraffins, separating said solution from the undissolved paraffins and removing solvent from the solution.

4. The method of separating olefinic hydrocarbons from a mixture of olefinic and paraffinic hydrocarbons which comprises contacting said mixture with nitro-isobutylene at a temperature between −80 and 150° F., at which temperature the olefinic hydrocarbons are substantially miscible with the nitro-isobutylene and the paraffinic hydrocarbons are substantially immiscible therein, separating the two liquid fractions from each other, and subsequently separating the nitro-isobutylene from the separated paraffinic and olefinic fractions, respectively.

5. The method of separating normally gaseous olefins from a mixture of normally gaseous olefins and paraffins which comprises selectively extracting said mixture with a nitro-olefin.

6. The method of separating $C_4$ hydrocarbons into paraffinic and olefinic fractions which comprises contacting said $C_4$ hydrocarbons with nitro-isobutylene at a temperature of about −80 to +40° F., separating the solution of olefins from the undissolved paraffins and subsequently separating the nitro-isobutylene from the olefins and paraffins, respectively.

7. The method of claim 5 wherein the extraction is at a temperature of −80 to +40° F.

CARL MAX HULL.